United States Patent
Hofrichter

(10) Patent No.: US 10,116,894 B2
(45) Date of Patent: *Oct. 30, 2018

(54) RETAIL OUTLET TV FEATURE DISPLAY SYSTEM

(71) Applicants: Sony Corporation, Tokyo (JP); Sony Electronics Inc., Park Ridge, NJ (US)

(72) Inventor: Klaus Hofrichter, San Diego, CA (US)

(73) Assignee: Sony Corporation, Tokyo (JP)

( * ) Notice: Subject to any disclaimer, the term of this patent is extended or adjusted under 35 U.S.C. 154(b) by 576 days.

This patent is subject to a terminal disclaimer.

(21) Appl. No.: 14/457,899

(22) Filed: Aug. 12, 2014

(65) Prior Publication Data

US 2014/0351850 A1    Nov. 27, 2014

Related U.S. Application Data

(63) Continuation of application No. 12/142,158, filed on Jun. 19, 2008, now Pat. No. 8,924,855.

(51) Int. Cl.

| | |
|---|---|
| *H04N 5/445* | (2011.01) |
| *H04N 21/431* | (2011.01) |
| *H04N 21/488* | (2011.01) |
| *H04N 21/414* | (2011.01) |
| *H04N 21/482* | (2011.01) |
| *H04N 21/81* | (2011.01) |

(52) U.S. Cl.
CPC ... *H04N 5/44513* (2013.01); *H04N 21/41415* (2013.01); *H04N 21/431* (2013.01); *H04N 21/482* (2013.01); *H04N 21/4882* (2013.01); *H04N 21/8126* (2013.01)

(58) Field of Classification Search
CPC .......... H04N 21/41415; H04N 21/431; H04N 21/482; H04N 21/4882; H04N 21/8126; H04N 5/44513

See application file for complete search history.

(56) References Cited

U.S. PATENT DOCUMENTS

| 6,502,076 | B1 * | 12/2002 | Smith | G06Q 30/02 705/14.54 |
|---|---|---|---|---|
| 2001/0010663 | A1 * | 8/2001 | Nakazawa | G06T 13/205 369/2 |
| 2004/0210477 | A1 * | 10/2004 | McIntyre | G06Q 30/02 705/14.49 |
| 2006/0026636 | A1 * | 2/2006 | Stark | H04N 5/44543 725/37 |
| 2006/0153040 | A1 * | 7/2006 | Girish | G06F 1/1616 369/59.21 |
| 2009/0007017 | A1 * | 1/2009 | Anzures | G06F 3/04883 715/835 |
| 2009/0046838 | A1 * | 2/2009 | Andreasson | H04M 3/4285 379/101.01 |
| 2009/0049479 | A1 * | 2/2009 | Green | H04N 5/44543 725/46 |
| 2009/0153736 | A1 * | 6/2009 | Mortensen | H04N 5/44513 348/569 |

(Continued)

*Primary Examiner* — Andrea N Long
(74) *Attorney, Agent, or Firm* — John L. Rogitz

(57) ABSTRACT

An automatic feature demonstration mode for TV products that can be used in retail stores. TV features that otherwise would be overlooked by customers or misrepresented by the sales staff are advertised on the TV itself. The system may be used to convey information beyond TV features.

23 Claims, 2 Drawing Sheets

(56) References Cited

U.S. PATENT DOCUMENTS

2009/0158314 A1\* 6/2009 Flynn ................. H04N 21/4312
  725/32
2010/0198400 A1\* 8/2010 Pascal ....................... G07F 9/02
  700/232

\* cited by examiner

RETAIL OUTLET TV FEATURE DISPLAY SYSTEM

FIELD OF THE INVENTION

The present invention relates generally to presenting information regarding a TV's features on the TV display itself in a retail establishment.

BACKGROUND OF THE INVENTION

TVs in a retail location typically are energized side by side to show the same video (such as from a TV station) so that customers can compare the video quality and cosmetic design between different TV models and brands. To provide the customers further information regarding particular TV features, posters or cards are mounted near the TV to explain the TV features, since the features themselves are not easily visible to the customer. Such features include, e.g., the presence of an electronic program guide (EPG), ease of use of the TV's graphical user interface (GUI), etc.

As understood herein, advertising features using cards or posters might not always be effective, because customers spend most of their attention on the TV display itself. Furthermore, the advertising may not be completely controlled by the TV manufacturer. For instance, the placement of the advertising is controlled by the retail outlet, and a poster or card for a TV might mistakenly be placed near the wrong TV, meaning that the manufacturer might not be able to control errors the creep in to the advertising.

SUMMARY OF THE INVENTION

Embodiments herein address the above situation by adding an automatic presentation of device features that are displayed on the TV itself, typically simultaneously with a video presentation.

Accordingly, a TV system includes a TV display and a processor automatically presenting, in a loop, a sequence of feature presentations on the display advertising respective features of the TV. The features may include, without limitation, an electronic program guide, a photo slideshow, a user interface feature, or a connectivity feature. The feature presentation may include a banner carrying the title of the feature.

If desired, the sequence of feature presentations can be presented on the TV display simultaneously with video that is not related to the feature presentation. The processor can disable feature presentation in response to, e.g., a user entering a setup mode of the TV, a user pressing any key on the TV, etc.

In another aspect, a TV system includes a TV display, a TV tuner configured to receive TV signals for presentation on the display, and a processor communicating with the display to send feature presentation images thereto in a loop automatically while the TV is energized in a retail outlet. In this way, consumers can view the display to learn what features are possessed by the TV.

In still another aspect, a method includes loading, onto a digital storage medium associated with a TV, a script executable by a processor in the TV. The method also includes loading, onto the medium, content related to features possessed by the TV. Also, the method includes, when the TV is energized in a retail outlet, causing the processor under control of the script to display the content on the TV.

Retailer customization of the displayed features may be provided for. Retailers may be permitted to add their own individual content, e.g., logos, current special offer, other promotions, etc. to the feature content. This may be done by adding the individual extra content to, e.g., the existing script on the digital storage medium such as a USB memory stick or through a network server using software tools such as but not limited to PC-based tools, web-based applications, etc.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
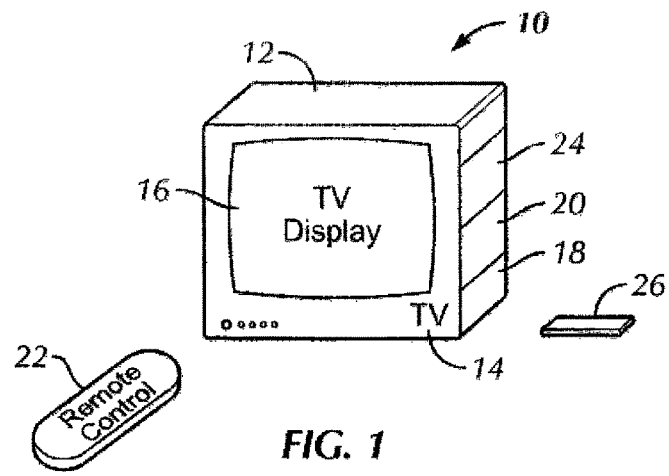
FIG. 1 is a non-limiting block diagram of a system in accordance with present principles, schematically showing internal components of the TV.

Referring initially to FIG. 1, a system is shown, generally designated 10, which includes a television 12 defining a TV chassis 14 and a TV display 16 on the chassis 14. The TV 12 also includes a TV processor 18 and tangible computer readable storage medium 20 in the chassis 14. The tangible computer readable medium 20 may be established by, without limitation, solid state storage, optical or hard disk storage, etc. The tangible computer readable media herein may store software executable by one or more of the processors to, e.g., control a display driver that drives the TV display 16. The display 16 may be a flat panel matrix display, cathode ray tube, or other appropriate video display. The medium 20 may also contain additional code including 3D graphics software executable by the TV processor 18. The TV processor 18 may execute the logic below, which may be stored as computer code on one or more the computer readable media described herein. A wireless remote control device 22 may also be provided to send commands to the processor 18 to, among other things, select a channel to which a TV tuner 24 should tune. A memory module 26 such as a Sony Memory Stick™ may be removably engaged with the TV 12 to exchange information with the TV processor 18.

Figure 2:
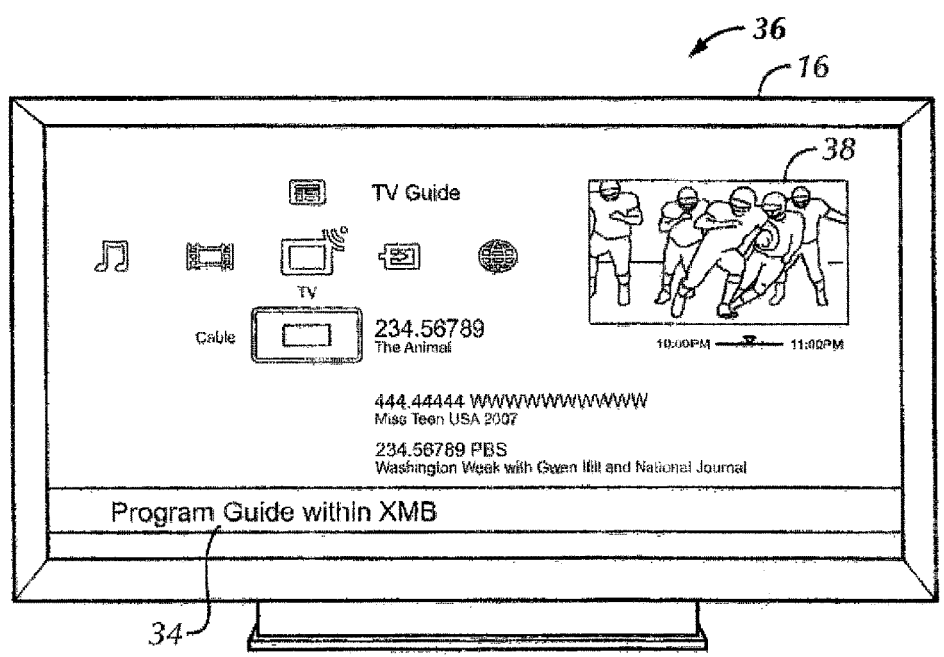
FIG. 2 is a non-limiting screen shot showing an embodiment of present principles.
Figure 3:
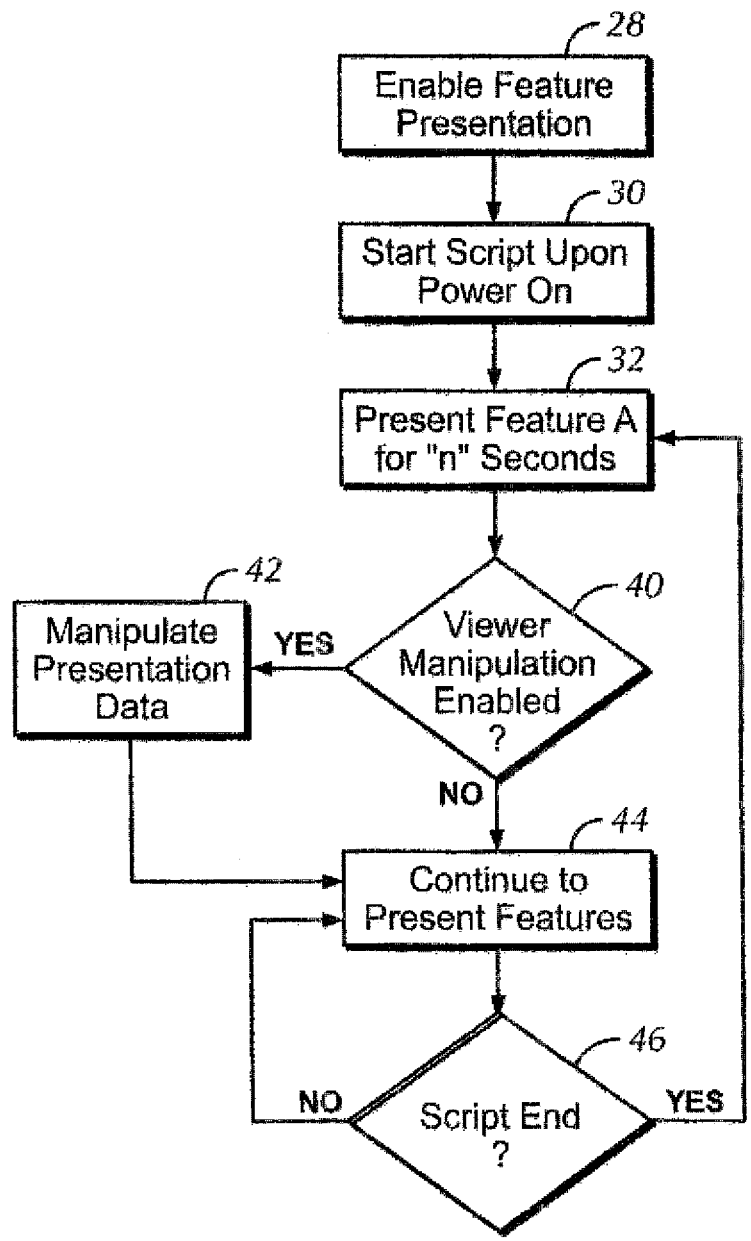

Now referring to FIGS. 2 and 3, as shown in FIG. 2 and indicated at block 28 in FIG. 3, the feature presentation capability of the TV 12 in accordance with present principles is enabled. The feature presentation can be enabled by factory default, or by the retailer. In one implementation, the presentation can be driven by a script which automatically starts when the TV is powered on in the retail location and thus in this implementation relies on no external infrastructure, because the script is loaded onto the memory module 20. However, other embodiments can integrate external infrastructure such as an Internet connection, home network or the memory module 26 to input the script to the TV processor 18.

In any case, at block 30 the TV processor 18 commences the script upon power on in the retail location. The TV processor 18 may be programmed to recognize initial power on as energization occurring in a store, or it may regard any power on as a trigger to start the script until the script is disabled as described below.

At block 32, the first feature in the script (referred to as feature "A" in FIG. 3) is presented. As indicated at 32 in FIG. 2, the first feature presentation may include, e.g., a banner 34 carrying the title of the feature (in the example shown, "Program Guide with XMB" standing for "cross-menu bar"). As generally indicated at 36 in FIG. 2, the content of the feature presentation may also include the feature itself, in this case, icons representing content sources and alpha-numeric indications of the content supplied from the sources as shown. In general, the feature presentation may include pictures, text, video, audio. The content of the feature presentation may be preinstalled on the TV 12 by, e.g., storing it in the medium 20, for access thereof by the processor 18. The content may be updated as desired using the Internet or, e.g., the memory module 26.

As also shown in FIG. 2 at 38, live video from, e.g., a tuned-to TV station may be simultaneously presented on the TV display 16 along with the feature presentation 34, 36. In the embodiment shown the live video 38 is in a picture-in-picture mode in which the live video occupies only part of the display 16, with the feature presentation occupying the remainder of the display. In other implementations the live video may occupy the entire display 18 and the feature presentation overlaid on the live video. In still other implementations only the feature presentation may appear on the display 16.

Returning to FIG. 3, as indicated at block 32 the first feature is presented for a predetermined period of "n" seconds. Additionally or alternatively, if viewer manipulation is provided for at decision diamond 40, a retailer or third party can be provided with tools to manipulate the presentation data at block 42 to include local advertisement (e.g. price information for this model, or rebate/bundle offers). In a further embodiment, such updates can be controlled via an online network and may include real-time data such as weather and traffic information.

Block 44 indicates that additional features are presented as called for by the script in accordance with above principles until the TV processor determines at decision diamond 46 that the script has ended, in which case the process loops back to the start of the script at block 32.

With the above in mind, it may now be appreciated that present principles help make customers in a retail store aware of differentiating TV features that would normally not be displayed. In addition to EPG, these feature may include, without limitation, photo slideshow (in which a viewer is informed of operating a photo slideshow of photos that might be stored in the medium 20), user interface features, connectivity features (e.g., how to connect to the Internet for Internet-enabled TVs), home networking capability, online content access, content download service information, content streaming service information, music playback information, picture quality settings, and soon. The feature presentation advantageously does not depend on retail store setup or interaction if desired, motivating retailers not to disable the scripted presentation mode.

In some embodiments, the above-described automatic launch at power on is disabled when a customer runs "setup" in the home. "Setup" ordinarily is accessed from an initial menu and entry of the setup mode may be used as a signal to the TV processor 18 to disable the script. If desired, a menu entry may be provided in the "setup" mode to reenable the script.

A simple script that may be used may include a list of image content that is to be displayed in a sequence. As described above, the linear presentation may loop indefinitely. A more complex script may be based on a programming language such as Java, or a presentation format such as Adobe Flash™. This may include interactive features such as permitting the viewer to manipulate the sequence of the presentation.

While the particular RETAIL OUTLET TV FEATURE DISPLAY SYSTEM is herein shown and described in detail, it is to be understood that the subject matter which is encompassed by the present invention is limited only by the claims.

What is claimed is:

1. A system, comprising:
   at least one computer memory with instructions executable by a processor; and
   a processor configured for communicating with a display device and to execute the instructions which when executed by the processor configure the processor to:
   send feature presentation images thereto to the display device in a loop in a first sequence of feature presentation images at least while the display device is energized in a retail outlet, and
   disable feature presentation in response to a user entering a setup mode of the display device, the setup mode being accessed from an initial menu and entry of the setup mode from the initial menu being used as a signal to disable the feature presentation, a menu entry being provided in the setup mode to reenable the feature presentation.

2. The system of claim 1 wherein a first feature is an electronic program guide.

3. The system of claim 1, wherein a second feature is a photo slideshow.

4. The system of claim 1 wherein a second feature is a user interface feature.

5. The system of claim 1, wherein a second feature includes connectivity features.

6. The system of claim 1, wherein a feature presentation includes a banner carrying the title of the feature.

7. The system of claim 1, wherein the instructions when executed by the processor configure the processor to present the sequence of feature presentations on the display device simultaneously with video that is not related to the feature presentation.

8. The system of claim 1, comprising the display device.

9. A method comprising:
   sending feature presentation images to a display device in a loop in a first sequence of feature presentation images at least while the display device is energized in a retail outlet, and
   disabling feature presentation in response to a user entering a setup mode of the display device, the setup mode being accessed from an initial menu and entry of the setup mode from the initial menu being used as a signal to disable the feature presentation, a menu entry being provided in the setup mode to reenable the feature presentation.

10. The method of claim 9 wherein a first feature is an electronic program guide.

11. The method of claim 9 wherein a second feature is a photo slideshow.

12. The method of claim 9 wherein a second feature is a user interface feature.

13. The method of claim 9 wherein a second feature includes connectivity features.

14. The method of claim 9 wherein a feature presentation includes a banner carrying the title of the feature.

15. The method of claim 9 comprising:

presenting the sequence of feature presentations on the display device simultaneously with video that is not related to the feature presentation.

16. An apparatus comprising:

at least one computer memory that is not a transitory signal and that comprises instructions executable by at least one processor to:

send feature presentation images to a display device in a loop in a first sequence of feature presentation images at least while the display device is energized in a retail outlet, and disable feature presentation in response to a user entering a setup mode of the display device, the setup mode being accessed from an initial menu and entry of the setup mode from the initial menu being used as a signal to disable the feature presentation, a menu entry being provided in the setup mode to reenable the feature presentation.

17. The apparatus of claim 16 wherein a first feature is an electronic program guide.

18. The apparatus of claim 16 wherein a second feature is a photo slideshow.

19. The apparatus of claim 16 wherein a second feature is a user interface feature.

20. The apparatus of claim 16, wherein a second feature includes connectivity features.

21. The apparatus of claim 16, wherein a feature presentation includes a banner carrying the title of the feature.

22. The apparatus of claim 16, wherein the instructions are executable to present the sequence of feature presentations on the display device simultaneously with video that is not related to the feature presentation.

23. The apparatus of claim 16, comprising the display device.

* * * * *

UNITED STATES PATENT AND TRADEMARK OFFICE
CERTIFICATE OF CORRECTION

| | |
|---|---|
| PATENT NO. | : 10,116,894 B2 |
| APPLICATION NO. | : 14/457899 |
| DATED | : October 30, 2018 |
| INVENTOR(S) | : Klaus Hofrichter |

It is certified that error appears in the above-identified patent and that said Letters Patent is hereby corrected as shown below:

On the Title Page

Item (73), delete:
"SONY CORPORATION
1-7-1 KONAN
MINATO-KU
TOKYO, JAPAN 108-0075"

And insert:
--SONY ELECTRONICS INC.
1 SONY DRIVE
PARK RIDGE, NEW JERSEY 07656--

Signed and Sealed this
Fifth Day of November, 2019

Andrei Iancu
*Director of the United States Patent and Trademark Office*